United States Patent [19]

Van Herk

[11] 4,434,445
[45] Feb. 28, 1984

[54] MAGNETIC HEAD FOR HIGH TRACK DENSITY

[75] Inventor: Alfred Van Herk, Eindhoven, Netherlands

[73] Assignee: U.S. Philips Corporation, New York, N.Y.

[21] Appl. No.: 317,105

[22] Filed: Nov. 2, 1981

[30] Foreign Application Priority Data

Nov. 13, 1980 [NL] Netherlands ............... 8006193

[51] Int. Cl.³ ............................................. G11B 5/25
[52] U.S. Cl. ..................................... 360/121; 360/119
[58] Field of Search ......................... 360/119, 120, 121

[56] References Cited

U.S. PATENT DOCUMENTS

| | | | |
|---|---|---|---|
| 2,531,642 | 11/1950 | Potter | 360/120 |
| 3,165,592 | 1/1965 | Brette | 360/121 |
| 3,214,746 | 10/1965 | McCreary | 360/121 |

FOREIGN PATENT DOCUMENTS 2044598  3/1972  Fed. Rep. of Germany ...... 360/119

OTHER PUBLICATIONS

IBM Technical Disclosure Bulletin vol. 6, No. 1, Jun. 1963, p. 91, Transducer, L. F. Shew.

Primary Examiner—George G. Stellar
Attorney, Agent, or Firm—Joseph P. Abate

[57] ABSTRACT

A magnetic head for writing and/or reading information in mutually parallel tracks of a magnetic recording medium includes a transducing gap having a depth of the same order of magnitude as the longest wavelength on the recording medium. The gap also has a slope of less than or equal to 45° relative to the head surface which faces the medium.

2 Claims, 4 Drawing Figures

MAGNETIC HEAD FOR HIGH TRACK DENSITY

BACKGROUND OF THE INVENTION

The invention relates to a magnetic head for writing and/or reading information in parallel tracks on a magnetic recording medium with high track density, and particularly to such a head comprising a magnet core which includes two oppositely located parts which enclose a transducing gap between them and around which core an electric winding is provided, the magnetic head further comprising means for reducing side fringing effects.

Magnetic heads which are used for writing or reading information in narrow closely adjacent tracks, in particular, on magnetic disks (in which the head during operation floats at a small distance above the recording medium) show a side fringing effect. During writing, so-called track-widening occurs: due to lateral stray fields, the written track is wider than the width of the transducing gap. In addition, upon reading, a certain amount of side fringing response occurs: signals recorded beside the head in the magnetic layer of the recording medium are also read. These effects, of which the side fringing response increases exponentially with the wavelength of the recorded signal, are ascribed to the fact that the side gaps of the magnetic head (these are the parts of the transducing gap opening into the two side faces of the head) "become operative" at high track densities. In order to reduce these effects, a few solutions have already been suggested. For example, it is known from Japanese Patent Application Kokai No. 54-76217 to bevel the side faces of the magnetic head and to cover the side gaps with a vapor-deposited layer of magnetic material, and Japanese Patent Application Kokai No. 54-58425 suggests making the length of the side gaps a few times longer than the longest wavelength of the signals used. Both solutions require extra technological steps which make the head expensive.

SUMMARY OF THE INVENTION

It is the object of the present invention to provide a magnetic head having means for reducing the detrimental effects of the side gaps in the manufacture of which head no extra technological steps are necessary.

For that purpose, the magnetic head according to the invention is characterized in that, with a gap depth which is of the order of magnitude of the longest wavelength on the recording medium, the slope $\alpha$ of the transducing gap is so oriented relative to the face facing the recording medium that $\alpha \leq 45°$.

It has been found that, when the transducing gap does not make an angle of 90° with the tape contact face, as is the case in the known heads, but a considerably smaller angle, in particular, an angle of at most 45°, the detrimental effects of the side gaps can be reduced, at least in a wavelength range where the wavelength is of the order of magnitude of the depth of the transducing gap. The smaller the angle, the better the effect, but the technological possibilities form a restricting factor here. Dependent on the value of the angle $\alpha$, for example, a reduction of the lateral cross-talk from 1 dB to 6 dB is possible. In itself, no extra steps in the manufacturing process of the head are necessary for the reduction of the detrimental effects of the side gaps obtained in this manner.

It is to be noted that Japanese Patent Application Kokai No. 53-102013 discloses a magnetic head in which the faces which define the transducing gap are so inclined with respect to the face of the recording medium that the angle which they enclose with the Ledving part of the recording medium is obtuse. An increase of the magnetic resistance of the transducing gap is then obtained. However, this known head construction has nothing to do with the concept underlying the present invention which is based on the recognition that, by adjusting the angle of the transducing gap relative to the tape contact face, the "lateral sensitivity" for signals of a given wavelength can be reduced.

The invention will be described in greater detail, by way of example, with reference to the accompanying drawing in which:

FIGS. 1, 2 and 3 show a conventional magnetic head during writing FIG. 1) and reading (FIGS. 2, 3), respectively, of information on a recording medium; and FIG. 4 shows a magnetic head according to the invention.

DESCRIPTION OF THE PREFERRED EMBODIMENT

Figure 1:
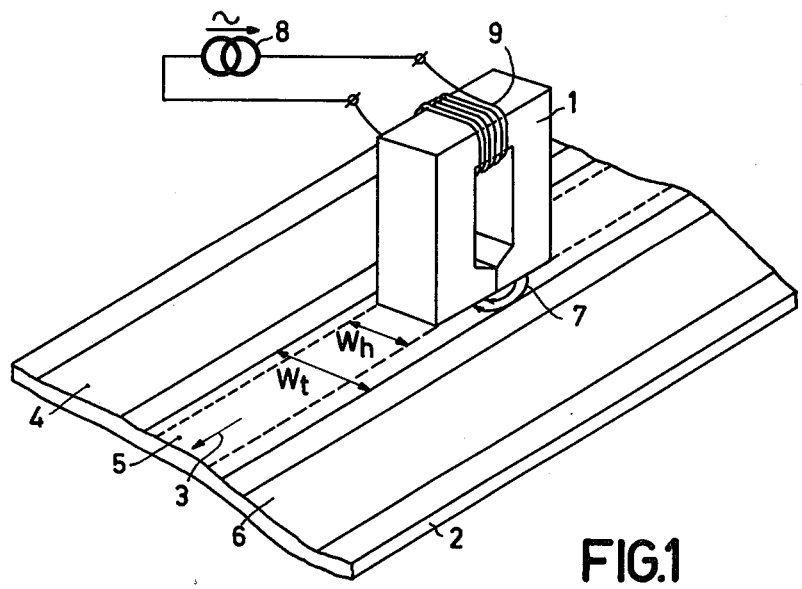

FIG. 1 shows a magnetic head 1 during a writing operation on a recording medium 2 which moves in the direction of the arrow 3 and has parallel information tracks 4, 5 and 6. A lateral stray field 7 emanates from the head 1, so that the track width $W_t$ of track 5 is larger than the width $W_h$ of head 1. Thus we have track widening $\Delta W = W_t - W_h$. During writing, a write current I is passed through an electric winding 9 by means of a current source 8.

Figure 2:
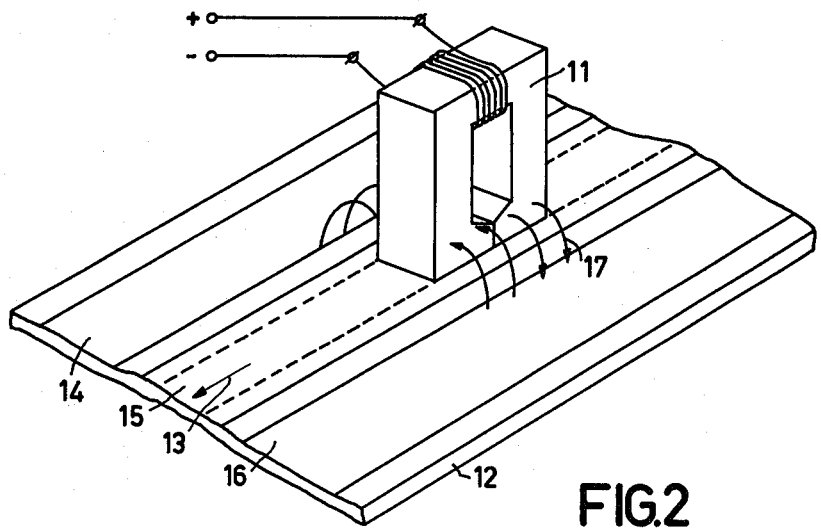

FIG. 2 shows a magnetic head 11 during a reading operation in which track 15 of a recording medium 12 moving in the direction of the arrow 13 is scanned. As a result of the sensitivity of the head 11 to lateral stray fields 17, information from track 16 is also read.

Figure 3:
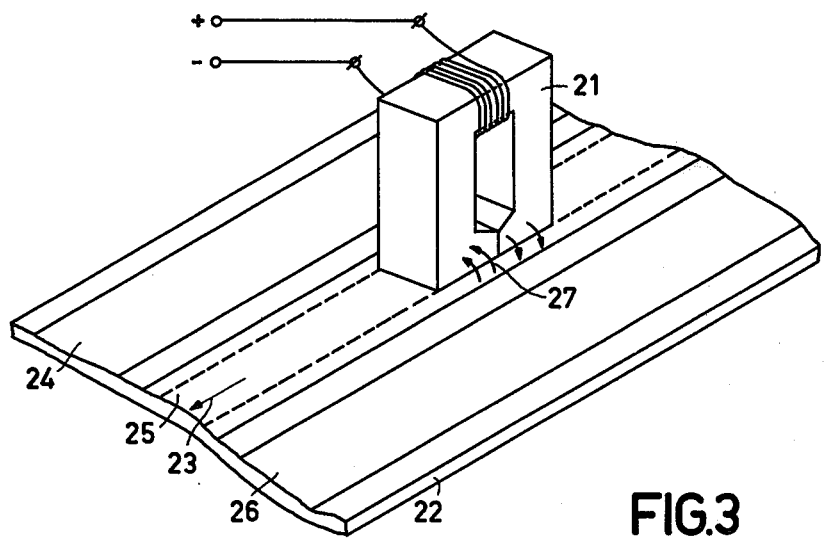

FIG. 3 shows a magnetic head 21 during a reading operation in which track 25 of a recording medium 22 moving in the direction of the arrow 23 is scanned. As a result of the sensitivity of head 21 to lateral stray fields 27, information present beside the head 21 is also read.

Figure 4:
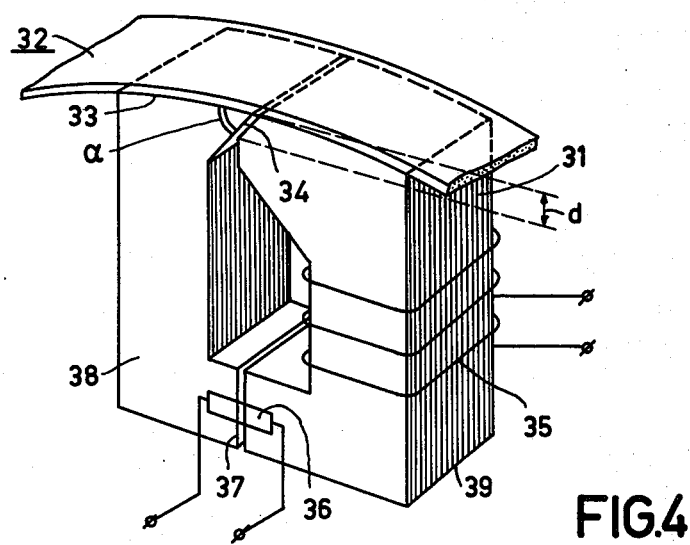

FIG. 4 shows a magnetic head according to the invention. It is constructed so that two core parts 38 and 39 define a transducing gap 34 which makes an angle ($\alpha$) with the surface 33 which, during operation, faces the recording medium 32, in this case, a magnetic tape. The value of the angle $\alpha$ is matched to the longest wavelength of the signals which were or are being recorded on the recording medium 32 with which the head 31 is in a flux-coupling relationship.

Recording of information is carried out by energization of an electric winding 35. For reading, the winding 35 may also be used—in which voltage variations induced therein by the moving magnetic recording medium via the transducing gap 34 are detected. For reading, a magnetoresistive element 36 placed in the stray field of (rear) gap 37 of the head 31 may be used instead of winding 35.

The best results, both as regards the reduction of the track widening and the reduction of the side fringing response, are reached when the gap depth d is of the order of magnitude of the longest wavelength on the recording medium 32.

In addition to use as a single track head for writing and/or reading information on recording media with high track density (for example a video head), the magnetic head according to the invention also has advantages when it is used in combination with a number of magnetic heads of the same type which are placed in juxtaposed relationship (so-called multitrack head unit).

What is claimed is:

1. A magnetic head (31) for writing and/or reading information in parallel tracks on a magnetic recording medium (32) with high track density, comprising a magnetic core which includes two oppositely located parts (38, 39) enclosing a transducing gap (34) between them, around which core an electric winding (35) is provided, the head (31) further comprising means for reducing side fringing effects, characterized in that the reducing means includes the gap having a depth d which is of the order of magnitude of the longest wavelength on the recording medium (32), and also having a slope $\alpha$ oriented relative to the surface (33) facing the recording medium (32) such that $\alpha \leqq 45°$.

2. A multitrack magnetic head unit, comprising a plurality of juxtaposed magnetic heads of the type as claimed in claim 1.

* * * * *